(12) United States Patent
Xiong

(10) Patent No.: US 9,996,979 B2
(45) Date of Patent: Jun. 12, 2018

(54) AUGMENTED REALITY TECHNOLOGY-BASED HANDHELD VIEWING DEVICE AND METHOD THEREOF

(71) Applicant: YOUNGZONE CULTURE (SHANGHAI) CO., LTD., Shanghai (CN)

(72) Inventor: Jianming Xiong, Shanghai (CN)

(73) Assignee: YOUNGZONE CULTURE (SHANGHAI) CO., LTD., Shanghai (CN)

( * ) Notice: Subject to any disclaimer, the term of this patent is extended or adjusted under 35 U.S.C. 154(b) by 31 days.

(21) Appl. No.: 15/125,582

(22) PCT Filed: Jul. 14, 2015

(86) PCT No.: PCT/CN2015/000502
§ 371 (c)(1),
(2) Date: Sep. 13, 2016

(87) PCT Pub. No.: WO2016/011788
PCT Pub. Date: Jan. 28, 2016

(65) Prior Publication Data
US 2017/0004651 A1    Jan. 5, 2017

(30) Foreign Application Priority Data

Jul. 24, 2014 (CN) .......................... 2014 1 0354263

(51) Int. Cl.
*G06T 19/00* (2011.01)
*G06F 3/03* (2006.01)
(Continued)

(52) U.S. Cl.
CPC ............ *G06T 19/006* (2013.01); *G06F 1/163* (2013.01); *G06F 1/1605* (2013.01); *G06F 3/011* (2013.01);
(Continued)

(58) Field of Classification Search
None
See application file for complete search history.

(56) References Cited

U.S. PATENT DOCUMENTS

| 2007/0176847 | A1* | 8/2007 | Shah | G06F 1/1616 345/1.1 |
| 2012/0120499 | A1* | 5/2012 | Harrison | G02B 17/06 359/631 |
| 2014/0267409 | A1* | 9/2014 | Fein | G06T 11/00 345/633 |

FOREIGN PATENT DOCUMENTS

| CN | 102 800 065 A | * 11/2012 | ............... G06T 5/00 |
| CN | 102800065 A | 11/2012 | |

(Continued)

*Primary Examiner* — Maurice L McDowell, Jr.
*Assistant Examiner* — Donna J Ricks
(74) *Attorney, Agent, or Firm* — Gokalp Bayramoglu

(57) ABSTRACT

An augmented reality technology-based handheld viewing device and a method thereof. The device includes a video collecting unit, which is used for capturing a real scene; an intelligent computing terminal, which is used for identifying a two-dimensional code to obtain code value information and space position information, then placing a preset virtual scene according to the space position information, and generating a viewing frame; a voice output unit, which is used for outputting voice information corresponding to the virtual scene; and a liquid crystal display screen. Compared with the prior art, the handheld viewing device can generate a virtual environment that highly matches the real scene and has vivid visual sense, hearing sense, touching sense, force sense, dynamic sense and can realize direct interaction (Continued)

between a user and virtual three-dimensional environment. For a child, more sensory stimulation is available, learning efficiency is improved, and the teaching with pleasure is achieved.

31 Claims, 10 Drawing Sheets

(51) Int. Cl.
| | |
|---|---|
| G06F 3/01 | (2006.01) |
| G06F 3/16 | (2006.01) |
| G06F 3/02 | (2006.01) |
| G06F 3/041 | (2006.01) |
| G06F 1/16 | (2006.01) |
| G09G 3/22 | (2006.01) |
| H04N 5/272 | (2006.01) |
| H04N 5/262 | (2006.01) |
| H04N 5/232 | (2006.01) |
| H04N 5/247 | (2006.01) |

(52) U.S. Cl.
CPC .............. *G06F 3/0304* (2013.01); *G06F 3/16* (2013.01); *G09G 3/22* (2013.01); *H04N 5/23293* (2013.01); *H04N 5/247* (2013.01); *H04N 5/2621* (2013.01); *H04N 5/272* (2013.01); *G06F 3/02* (2013.01); *G06F 3/041* (2013.01); *G09G 2360/144* (2013.01); *G09G 2370/02* (2013.01)

(56) References Cited

FOREIGN PATENT DOCUMENTS

| | | | | |
|---|---|---|---|---|
| CN | 103366610 A | * | 10/2013 | ............... G09B 5/06 |
| CN | 203 554 527 U | * | 4/2014 | ............. H04M 1/02 |
| CN | 203554527 U | | 4/2014 | |
| CN | 104102412 A | | 10/2014 | |
| WO | WO2013168954 A1 | | 11/2013 | |

* cited by examiner

AUGMENTED REALITY TECHNOLOGY-BASED HANDHELD VIEWING DEVICE AND METHOD THEREOF

TECHNICAL FIELD

The application relates to the technical field of augmented reality (AR), especially relates to an augmented reality technology-based handheld viewing device.

BACKGROUND

Augmented reality technology is a new technology which develops based on virtual reality, and is an important branch of the virtual reality research. Generally speaking, the augmented reality technology is to generate the virtual object which does not exist in the reality using the computer graphics technology and the visualization technology. Then, the virtual object is "embed" into the real environment precisely. Next, the virtual object is integrated into the real environment to form a whole through the display device. The virtual information is applied to the real world to show a new environment with realistic effect to the user, so as to achieve the augmented reality. For example, AR technology can imitate or stimulate the real information (e.g. visual sense information, the sound, the taste, or the touching sense, etc.) which is hard to be felt within a certain time or space in the real world using the science and technology. Then, the stimulation is combined with the real world to be felt by the human sense, such that the sensory experience beyond reality is achieved.

In addition, in prior art, toys or teaching aids for children are generally divided. into traditional type, innovative type, entity type, virtual type, entertaining type, and educational type. Corresponding mainstream products include early learning machine, point-and-read machine, point-and-read pen, e-book/e-schoolbag, flashcards, computer educational software, and so on. Through horizontal comparison, traditional educational types of toys or teaching aids have very little fun. It is difficult to mobilize the initiative of kids. The high-tech educational types of toys or teaching aids are complicated to operate, and has a high requirement of cognition and operation for the user. The form of playing or teaching is not good enough to bring along family interactions. Moreover, most of those toys or teaching products do not have any innovation. A great number of products just copy similar products. On the other hand, in recent years, with the popularity of tablet computers and smartphones, many early learning software began to pay attention to the portable mobile platform. However, the tablet computer is not developed for children. On current market, there are also a lot of voices against children playing the tablet computer. Problems on focus substantially include: 1) since the size of the tablet computer screen is relatively small, staring the screen for a long time is likely to cause the diminution of vision or nearsightedness of children: 2) when using the tablet computer, bending the neck for a long time to look at it may also affect the development of cervical vertebra of children; 3) if the child starts playing the software game at an early age, not only he may lose the fun of playing real environment game, but also his interest in learning may be affected or reduced; 4) although the touch control tablet computer or the smartphone changes the traditional interactive mode using the keyboard or the mouse, the interaction between the child and toys or teaching aids remains in a two-dimensional plane, which has a low sensory experience.

In view of the above, it is necessary to design a handheld viewing device, which can combine the current AR technology with traditional children toys or teaching aids to achieve the teaching with pleasure, such that children can naturally correlate the language learning, the image recognition, and three-dimensional digital model together while viewing. Enhancing sensory stimulation and improving the efficiency of learning are urgent issues demanding solutions from persons skilled in the relevant art.

SUMMARY OF THE INVENTION

With respect to the Above defects when applying the tablet computer and the smartphone in the children toys or teaching aids in the prior art, the application provides a novel, augmented reality technology-based handheld viewing device and the method thereof.

According to one aspect of the application, an augmented reality technology-based handheld viewing device is provided, including:

a video collecting unit, which is used for capturing the real scene through a first camera;

an intelligent computing terminal, which is used for recognizing a two-dimensional code in the real scene to obtain corresponding code value information and space position information, then positioning a preset virtual scene according to the space position information, and generating a viewing frame which mixes the real scene and the virtual scene;

a voice output unit, which is used for outputting the voice information corresponding to the virtual scene by a speaker; and a LED screen, which is round and is used for displaying the viewing frame generated by the intelligent computing terminal.

In one of the embodiments, when moving the handheld viewing device, when the handheld viewing device moves, the two-dimensional code in the real scene is moved. The intelligent computing terminal controls the image in the virtual scene to move according to the moving two-dimensional code. The LED screen outputs dynamic viewing frame after the handheld viewing device moves.

In one of the embodiments the intelligent computing terminal also includes a buffering unit, which is used for backing up the code value information and the space position information corresponding to a plurality of two-dimensional codes previous to a current frame, and for delaying the driving of the movement of the three-dimensional object in the virtual scene for a corresponding number of frames to reserve a process time for recognizing the two-dimensional code.

In one of the embodiments, the instantaneous position of the three-dimensional object in the virtual scene is obtained by interpolating the position information of the backed-up plurality of two-dimensional codes.

In one of the embodiments, the intelligent computing terminal includes a network interface, which is used for capturing a plurality of AR applications from the internet, and for selecting one AR application to execute according to the requirement of the user; and a two-dimensional code recognizing unit. When the user moves the two-dimensional code in the real scene to the capturing range of the first camera, the two-dimensional code recognizing unit automatically tracks and recognizes the two-dimensional code to obtain the code value information and the space position information.

In one of the embodiments, the intelligent computing terminal also includes a virtual scene generating unit, which is used for inquiring the matching virtual scene according to the space position information which comes from the two-dimensional code recognizing unit; and a virtual real-time rendering unit, which is used for rendering the inquired virtual scene in real time, and displaying the rendered scene which mixes the virtual scene with the real scene on the LED screen.

In one of the embodiments, the intelligent computing terminal also includes an interaction unit, which is used for recognizing an interaction operation of a face or a hand, and obtaining three-dimensional information implied in the real scene according to the interaction operation, and making the three-dimensional information and the three-dimensional object in the virtual scene directly interact.

In one of the embodiments, the real scene includes a book, a flash card, an object and an environmental image in a Science and Technology Museum or other museums.

In one of the embodiments, the handheld viewing device also includes a storage unit, which is used for storing the virtual scene data corresponding to the AR application.

In one of the embodiments, the intelligent computing terminal also includes a main thread processing unit, which is used for running the program logic operation and the rendering operation of the intelligent computing terminal; and a plurality of sub-thread processing units, which is used for performing an image collecting operation, and sending an image collecting result back to the main thread processing unit.

In one of the embodiments, the main thread processing unit sends an image collecting requirement to the sub-thread processing unit. The sub-thread processing unit performs the image collecting operation according to the image collecting requirement.

In one of the embodiments, the handheld viewing device has an external contour similar to that of a magnifier. The handheld viewing device includes a round body and a holding portion. The round body is provided with the LED screen having a touch control function. The connection portion between the round body and the holding portion has a control button.

In one of the embodiments, the touch control function of the LED screen uses a resistive, a capacitive, an infrared scanning, or an infrared image sensing type of sensor to realize a touch operation.

In one of the embodiments, the second camera and the microphone are arranged on the center of the top end of the round body. The second camera is used for collecting the real scene on one side of the LED. The microphone is used for receiving the voice interaction information of the user.

In one of the embodiments, the first camera is located on the other side which is located on the other side of the round body which is opposite to the LED screen. The first camera is used to collect and capture the real scene on this side. The first camera is the CCD (charged coupled device) image sensor or the CMOS (complementary metal-oxide-semiconductor) image sensor.

In one of the embodiments, a function button is arranged on the side of the round body, and is used for switching between different functions of the handheld viewing device.

In one of the embodiments, the handheld viewing device also includes a brightness sensor and an auxiliary backlight source. The brightness sensor is used for detecting the ambient light intensity of the handheld viewing device. The auxiliary backlight source provides auxiliary backlight when the ambient light intensity is not sufficient.

According to the other aspect of the application, an augmented reality technology-based handheld reading method is provided, including following steps:

the video collecting unit captures the real scene through a first camera;

the intelligent computing terminal recognizes the two-dimensional code in the real scene to obtain the corresponding code value information and space position information;

according to the position information, a preset virtual scene is positioned, and the viewing frame which mixes the real scene and the virtual scene is generated;

the voice output unit outputs the voice information corresponding to the virtual scene by the speaker; and the LED screen, which is round, displays the viewing frame generated by the intelligent computing terminal.

In one of the embodiments, the handheld reading method also includes: when the handheld viewing device is moved, the two-dimensional code in the real scene is moved. The intelligent computing terminal controls the image in the virtual scene to move according to the moving two-dimensional code. The LED screen outputs the dynamic viewing frame after the handheld viewing device moves.

In one of the embodiments, the handheld reading method also includes backing up the code value information and the space position information corresponding to a plurality of two-dimensional codes previous to the current frame; and delaying the driving of a movement of a three-dimensional object in the virtual scene for a corresponding number of frames to reserve a process time for recognizing the two-dimensional code.

In one of the embodiments, the instantaneous position of the three-dimensional objects in the virtual scene is obtained by interpolating the space position information of the backed-up plurality of two-dimensional codes.

In one of the embodiments, the intelligent computing terminal includes a network interface, which is used for capturing a plurality of AR application from the internet, and selecting one AR application to implement according to the requirement of the user; and a two-dimensional code recognizing unit. When the user moves the two-dimensional code in the real scene to a capturing range of the first camera, the two-dimensional code recognizing unit automatically tracks and recognizes the two-dimensional code to obtain the code value information and the space position information.

In one of the embodiments, the intelligent computing terminal also includes a virtual scene generating unit which is used for inquiring the matching virtual scene according to the space position information from the two-dimensional code recognizing unit; and a virtual real-time rendering unit, which is used for rendering the inquired virtual scene in real time, and displaying the rendered scene which mixes the virtual scene with the real scene on the LED screen.

In one of the embodiments, the intelligent computing terminal also includes an interaction unit, which is used for recognizing an interaction operation of a face or a hand, and obtaining three-dimensional information implied in the real scene according to the interaction operation, and making the three-dimensional information and the three-dimensional object in the virtual scene directly interact.

In one of the embodiments, the intelligent computing terminal also includes a main thread processing unit and a plurality of sub-thread processing unit. The main thread processing unit is used for running the program logic operation and rendering operation performed during the processing of the intelligent computing terminal; the sub-thread processing units are used for performing the image collecting operation, and sending the image collecting result back to the main thread processing unit.

In one of the embodiments, the AR applications include a book, a flash card, an object and an environmental image in a Science and Technology Museum or other museums.

According to yet another aspect of the application, an augmented reality technology-based handheld viewing device is provided, including:

A round body, which has a front side and a back side that are arranged Oppositely. A LED screen, a second camera and a microphone are arranged on the front side of the round body. A first camera and a speaker are arranged on the back side of the round body.

A holding portion is connected to the round body, and is used for holding the handheld viewing device:

The handheld viewing device renders the real scene which is captured by the first camera into a three-dimensional virtual scene, and then displays the viewing frame which mixes the real scene with the virtual scene through the LED screen.

In one of the embodiment, the LED screen has a touch control function, and can realize the touch control operation by a resistive, a capacitive, an nitrated scanning, or an infrared image sensing type of sensor.

In one of the embodiments, the second camera and the microphone are arranged in the center of the top end of round body. The second camera is used for collecting the real scene on the front side of the round body. The microphone is used for receiving the voice interaction information of the user.

In one of the embodiments, the first camera is used for collecting and capturing the real scene on the back side of the round body. The first camera is CCD (charged coupled device) image sensor or CMOS (complementary metal-oxide-semiconductor) image sensor.

In one of the embodiments, a function button is arranged on the side of the round body. The function button is used for switching between different functions of the handheld viewing device.

In one of the embodiments, the connection portion between the round body and the holding portion includes a control button.

In one of the embodiments, the handheld viewing device also includes a brightness sensor and an auxiliary backlight source. The brightness sensor is used for detecting the ambient light intensity of the handheld viewing device. The auxiliary backlight source provides auxiliary backlight when the ambient light intensity is not sufficient.

Using the handheld viewing device and method of the application, the video collecting unit captures the real scene through the first camera. The intelligent computing terminal recognizes the two-dimensional code in the real scene to obtain the code value information and the space position information, then the preset virtual scene is positioned according to the space position information, so as to generate the viewing frame which mixed the real scene and the virtual scene. The LED screen which is round is used for displaying the viewing frame generated by the intelligent computing terminal. Compared to the prior art, the application can generate a virtual environment that highly matches the real scene and has vivid visual sense, acoustic sense, touching sense, force sense, dynamic sense, and the like by using the intelligent computing terminal, and can realize direct interaction between the user and virtual three-dimensional environment. In this manner, children naturally correlate the language learning, image recognition, and the three-dimensional digital model together while learning, such that sensory stimulation is enhanced and the efficiency of learning is unproved. Teaching with pleasure is achieved.

BRIEF DESCRIPTION OF THE DRAWINGS

After reading the embodiments of the application with reference to drawings, readers will understand all aspects of the application more clearly. Drawings include.

DETAILED DESCRIPTION OF THE EMBODIMENT

Figure 1:
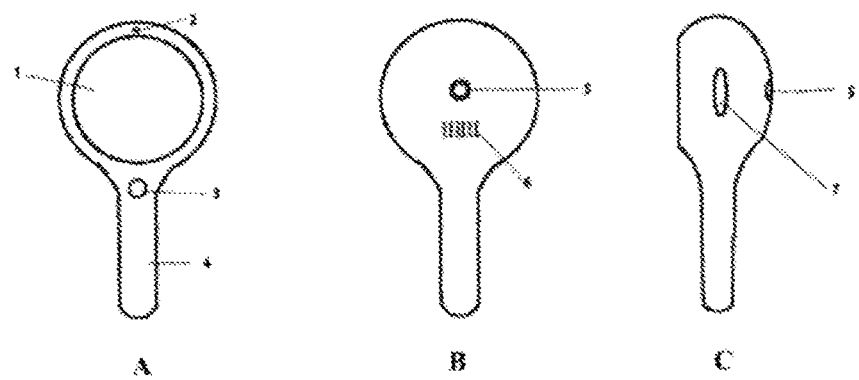
FIG. 1A~FIG. 1C show external contour schematic diagrams of the augmented reality technology-based handheld viewing device according to an embodiment of the application.

In order to make the technical content disclosed in the application more detailed and completed, drawings and various embodiments of the application as follows can be referred to. The same reference number in the drawings denote the same or similar component. However, the person skilled in this art should understand that embodiments provided hereinafter are not used to limit the scope of the application. Moreover, the drawings are only used for schematic illustration, and are not drawn according to original size.

Hereinafter, referring to the drawings, the embodiment of each aspect of the application will be further described in detail. FIG. 1A~FIG. 1C show the external contour schematic diagram of the augmented reality technology-based handheld viewing device according to one embodiment of the application. FIG. 1A is the front view of the device. FIG. 1B is the rear view of the device. FIG. 1C is the side view of the device.

Referring to FIG. 1A~FIG. 1C, the augmented reality technology-based handheld viewing device of the application has an external contour similar to that of the magnifier, and includes a round body and holding portion 4. The modeling of holding portion 4 is specially designed according to children physiology, and is convenient to be held by hands.

Specifically, the front surface of the round body has LED screen 1, the second camera and microphone 2. Here, the round LED screen can provide user the intuitive feeling of "to see the greatness from the trivialness" and "to see a world in a grain of a sand". That is because the rectangular screen is suitable for developing the scene broadly and widely, while the round screen is suitable for developing the scene closely and deeply. As compared to traditional rectangular screen, the corner of the round screen is imponderable, and the angle is inessential, so that it can show the front perspective interface all the time with the help of the sensor(s). For example, the second camera and microphone 2 are located in the center of the top of the body. The second camera (also can be called "the front camera") captures the real scene of the front side of the body. The microphone receives the voice interaction information of the user. First camera 5 ("the main camera") which has a high definition and speaker 6 are provided on the back side of the round body. Holding portion 4 is connected to the round body, and is used by the user to hold the viewing device, especially by children. The handheld viewing device renders the real scene captured by first camera 5 into the three-dimensional virtual scene, and shows the viewing frame which combines the real scene with the virtual scene through LED screen 1.

In one of the embodiments, LED screen 1 has a touch control function, and can realize the corresponding touch control operation by resistive capacitive, infrared scanning, or infrared image sensing sensor.

In one of the embodiments first camera 5 is used for collecting and capturing the real scene on the back side of round body. For example, first camera 5 is the charged coupled device (CCD) image sensor or the complementary metal-oxide-semiconductor (CMOS) image sensor.

In addition, the side of round body also includes function button 7, which is used for switching between different functions of the handheld viewing device. Preferably, the connection place between the round body and holding portion 4 also includes control button 3.

Additionally, in order to enable the reading and the viewing under any light condition, the application also includes a brightness sensor and an auxiliary backlight source (not shown in the figure). The brightness sensor is used for detecting the ambient light intensity of the device. The auxiliary backlight source is used to provide auxiliary backlight when the ambient light intensity is not sufficient.

Figure 2:
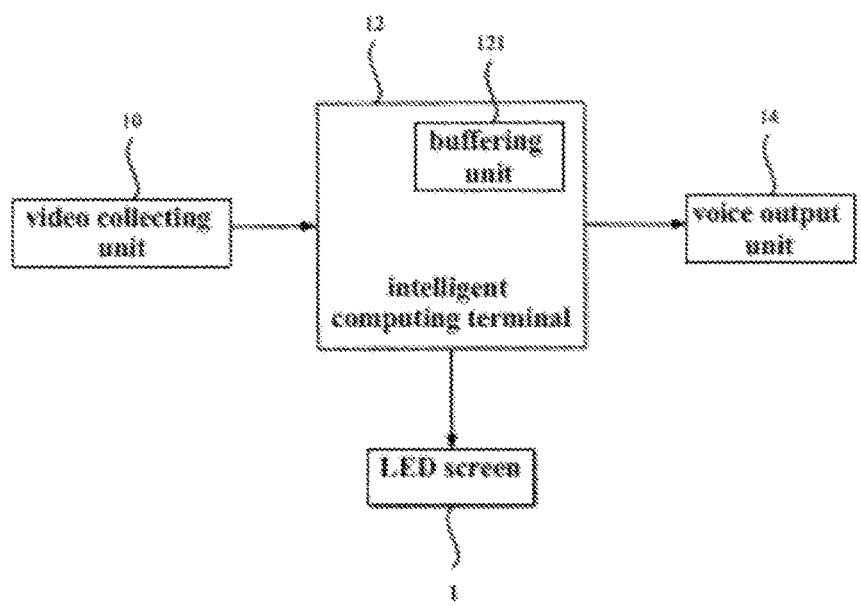
FIG. 2 shows a structural composition schematic diagram of the augmented reality technology-based handheld viewing device according to another embodiment of the application.

FIG. 2 shows a structural composition schematic diagram of the augmented reality technology-based handheld viewing device, according to another embodiment of the application. Referring to FIG. 2, in this embodiment, the handheld viewing device of the application includes video collecting unit 10, intelligent computing terminal 12, voice output unit 14, and LED screen 1.

Specifically, video collecting unit 10 is used to capture the real scene by the first camera (such as main camera 5 shown in FIG. 1). Intelligent computing terminal 12 is coupled to video collecting unit 10, and is used to recognize the two-dimensional code in the captured real scene to obtain corresponding code value information and space position information. Then, a preset matching virtual scene is positioned according to the space position information. The viewing frame which mixes the real scene and the virtual scene is generated. Voice output unit 14 is coupled to intelligent computing terminal 12, and is used to output the voice information corresponding to the virtual scene through the speaker (such as speaker 6 shown in FIG. 1). LED screen 1 is round, which is coupled to intelligent computing terminal 12, and is used to display the viewing frame generated by intelligent computing terminal 12.

In one of the embodiments, when the viewing user, especially a child, moves the handheld viewing device, the two-dimensional code in the real scene is moved. Intelligent computing terminal 12 controls the moving of the image in the virtual scene, according to the moving two-dimensional code. LED screen 1 outputs dynamic viewing frame after the handheld viewing device moves.

Additionally, in order to avoid the problem when the moving speed of the two-dimensional code is too fast or the two-dimensional code deviates the capturing angle of the first camera too much, the instantaneous recognition of the two-dimensional code fails and the displaying of the three-dimensional virtual objects related to the two-dimensional code breaks off, intelligent computing terminal 12 of the application also includes buffering unit 121. Buffering unit 121 is used to backup and buffer the code value information and the space position information corresponding to a plurality of two-dimensional codes before the current frame. The driving of the movement of the three-dimensional virtual object in the virtual scene is delayed for a number of frames correspondingly, so as to reserve the processing time for recognizing the two-dimensional code. For example, the instantaneous position of the three-dimensional virtual object in the virtual scene is obtained by interpolating the space position information of a plurality of two-dimensional codes that have been backed up, so as to significantly improve the moving smoothness of the virtual object.

Figure 3:
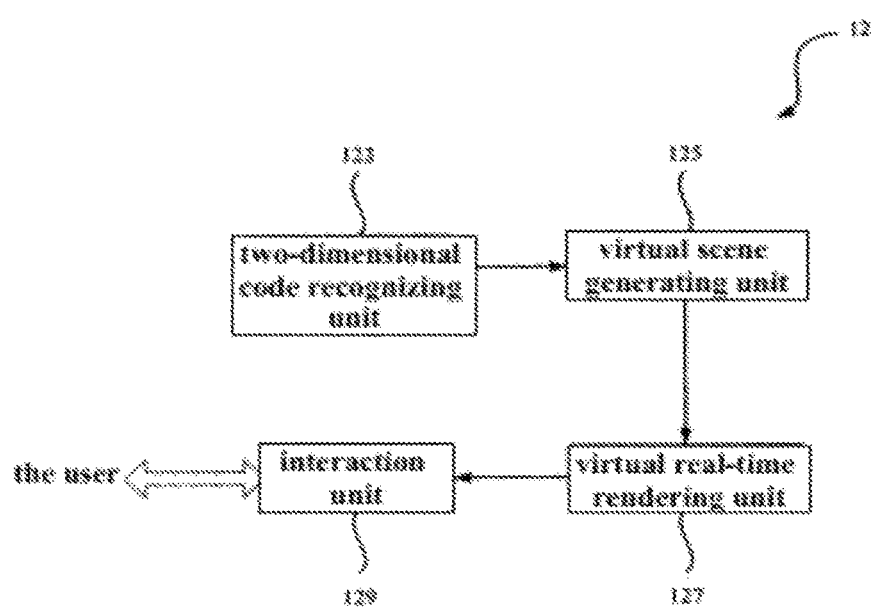
FIG. 3 shows an embodiment of the intelligent computing terminal of the handheld viewing device in FIG. 2.

FIG. 3 shows an embodiment of the intelligent computing terminal of the handheld viewing device in FIG. 2. Referring to FIG. 3, in this embodiment, intelligent computing terminal 12 also includes a network interface (not shown in the figure), two-dimensional code recognizing unit 123, virtual scene generating unit 125 and virtual real-time rendering unit 127. The network interface is used to obtain a plurality of AR applications from the interne, and to select one AR application to execute according to the requirement of the user. When the user moves the two-dimensional code in the real scene to the capturing range of the first camera, two-dimensional code recognizing unit 123 is used to automatically track and recognize the two-dimensional code, and to obtain corresponding code value information and space position information. Virtual scene generating unit 125 is coupled to two-dimensional code recognizing unit 123, and is used to inquiry the matching virtual scene according to the space position information from two-dimensional code recognizing unit 123. Virtual real-time rendering unit 127 is used to render the inquired virtual scene in real time. Then, the rendered virtual scene and the real scene are mixed and displayed on the LED screen.

In one of the embodiments, intelligent computing terminal 12 also includes interaction unit 129, which is used to recognize interacting operations of the face or hands, and to obtain the three-dimensional information implied by the real scene according to the interaction operation. As a result, direct interaction between the three-dimensional information and the three-dimensional objects in the virtual scene is enabled, such that the interactive entertainment is improved. For example, the above real scene includes books, flashcards, objects and environmental images in the Science and Technology Museum or other museums.

In addition, the handheld viewing device may also include a storage unit (not shown in the Figure), which is used for storing the virtual scene data corresponding to the AR application, so as to achieve augmented reality experience in the offline state of the device.

Figure 4:
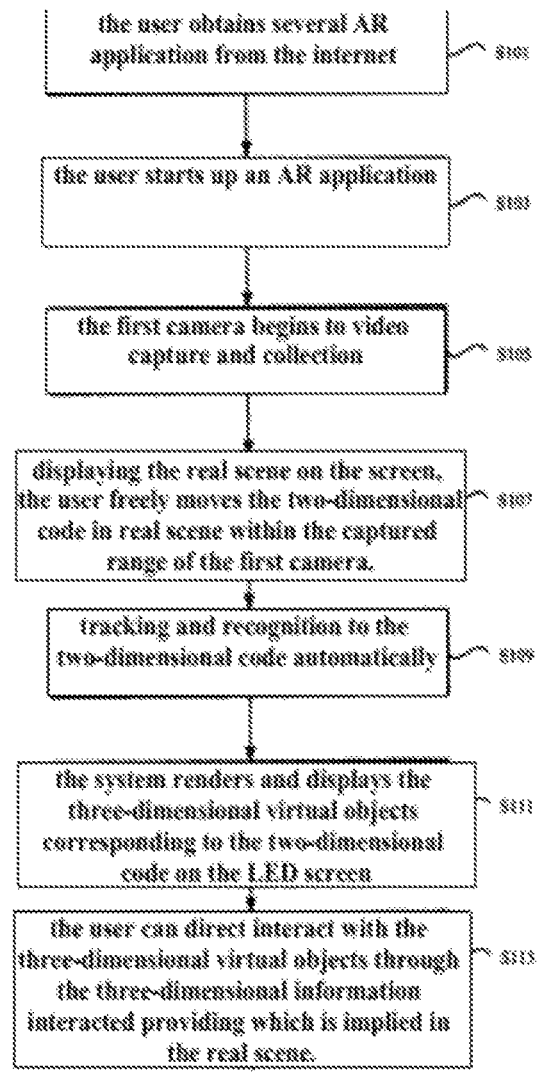
FIG. 4 shows a flow block diagram of realizing the viewing frame of the augmented reality of the handheld viewing device in FIG. 3.

FIG. 4 shows a flow diagram of realizing the viewing frame of the augmented reality of handheld viewing device in FIG. 3.

Referring to FIG. 4 in conjunction with FIG. 3, steps S101 and S103 are performed first. The user obtains a plurality of AR applications through the interne, and start up one of the applications. In steps S105 and S107, the first camera begins to collect and capture the video and then displays the collected and captured real scene on the screen. The user freely moves the two-dimensional code of the real scene within the capturing range of the first camera. Next, tracking and recognizing of the two-dimensional code is performed automatically, as shown in step S109. Step S111 is performed at last. The system renders the three-dimensional virtual object corresponding to the two-dimensional code and displays it on the LED screen. Moreover, the user can provide the three-dimensional information implied by the real scene through interactions, such that the three-dimensional information directly interacts with the three-dimensional virtual objects.

Figure 5:
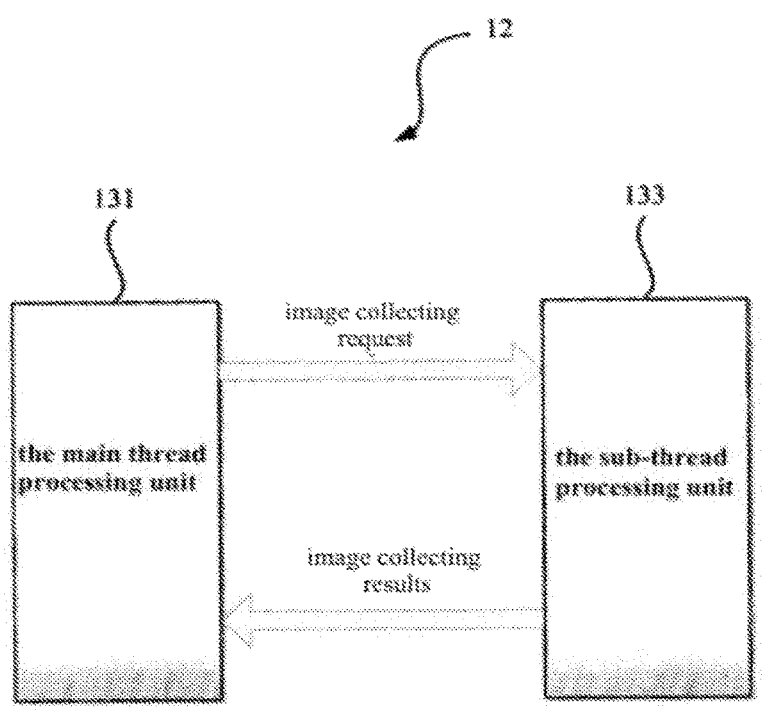
FIG. 5 shows another embodiment of the intelligent computing terminal of the handheld viewing device in FIG. 2.

FIG. 5 shows another embodiment of the intelligent computing terminal of the handheld viewing device in FIG. 2. Referring to FIG. 5, in this embodiment, intelligent computing terminal 12 also includes main thread processing unit 131 and sub-thread processing unit 133. Main thread processing unit 131 is used to run the program logic operation and the rendering operation of intelligent computing terminal 12. A plurality of sub-thread processing unit 133 is used to perform the image collecting operation, and to send the image collecting result back to main thread processing unit 131. For example, main thread processing unit 131 sends the image collecting requirement to sub-thread processing unit 133 first. Sub-thread processing unit 133 performs the image collecting operation according to the image collecting requirement, and sends the image collecting result back to main thread processing unit 131 to go through subsequent process.

Figure 6:
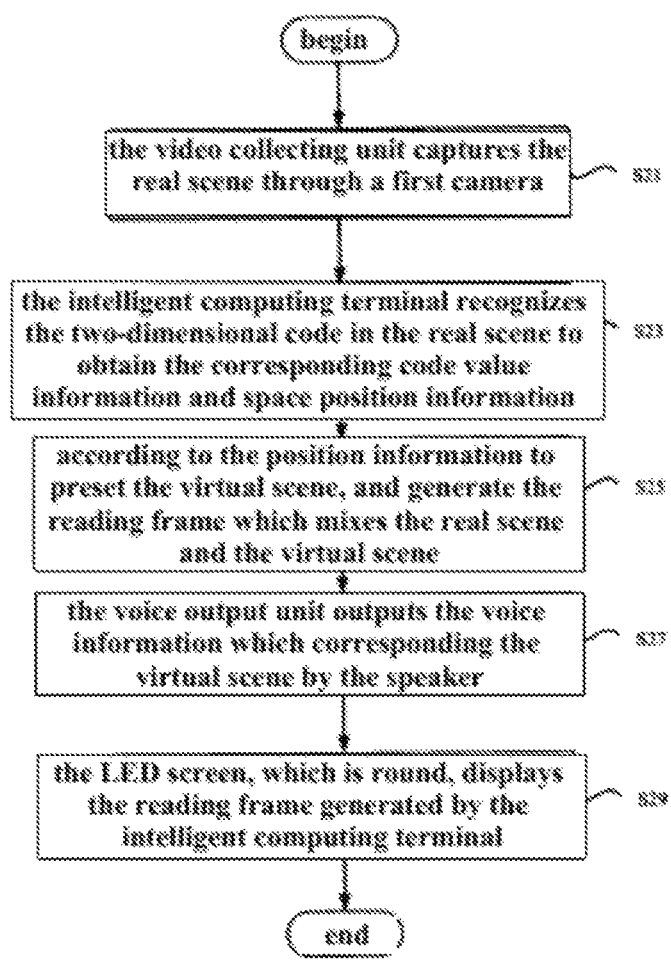
FIG. 6 shows a flow block diagram of the handheld viewing manner which is based on the augmented reality technology according to yet another embodiment of the application.

FIG. 6 shows a flow diagram of the handheld viewing manner which is based on the augmented reality technology according to yet another embodiment of the application.

Referring to FIG. 6 in conjunction with FIG. 2, in the viewing manner, step S21 is performed first, video collecting unit 10 captures the real scene through the first camera. Then, steps S23 and S25 are performed. Intelligent computing terminal 12 recognizes the two-dimensional code captured in the real scene to obtain corresponding code value information and space position information. Then, the preset virtual scene is positioned according to the space position information. The viewing frame which mixes the real scene and the virtual scene is generated. Next, in step S27, voice output unit 14 outputs the voice information corresponding to the virtual scene through the speaker. Step S29 is performed finally. Round LED screen 1 displays the viewing frame which is generated by intelligent, computing terminal 12.

In one embodiment the handheld viewing manner also includes steps: when the handheld viewing device is moved, the two-dimensional code in the real scene is moved. The intelligent computing terminal controls the moving of the image in the virtual scene according to the moving two-dimensional code. LED screen outputs dynamic viewing frame after the handheld viewing device moves.

In one embodiment, the handheld viewing manner also includes the following steps. The code value information and space position information corresponding to a plurality of two-dimensional codes previous to current frame are backed up. The driving of the movement, of the three-dimensional object in the virtual scene is delayed for a number of frames correspondingly, so as to reserve the processing time for recognizing the two-dimensional code. For example, the instantaneous position of the three-dimensional virtual object in the virtual scene is obtained by interpolating the space position information of the plurality of two-dimensional codes that have been backed up.

Figure 7:
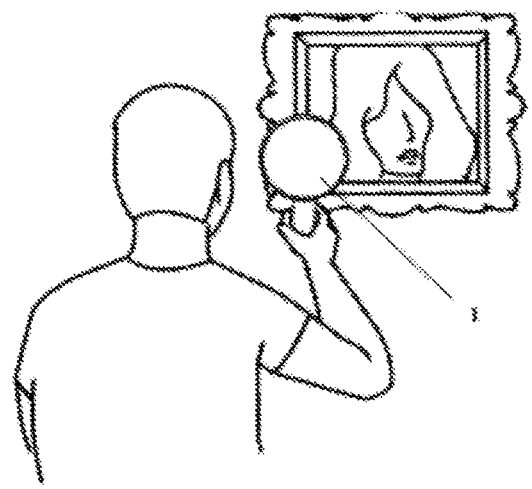
FIG. 7 shows a schematic diagram of the effect of the augmented reality which uses the first embodiment of the handheld viewing manner in FIG. 6.

FIG. 7 shows a schematic diagram of the effect of the augmented reality which uses the first embodiment of the handheld viewing manner of in FIG. 6. In FIG. 7, when the user takes the handheld viewing device towards a famous painting in a museum, the main camera of the device captures the famous painting, and mixes the preset three-dimensional virtual animation with the real object. Finally, the visual effect which can be seen on round screen 1 is that the famous painting in a still image in the real scene begins to turn into a mixed dynamic image.

Figure 8:
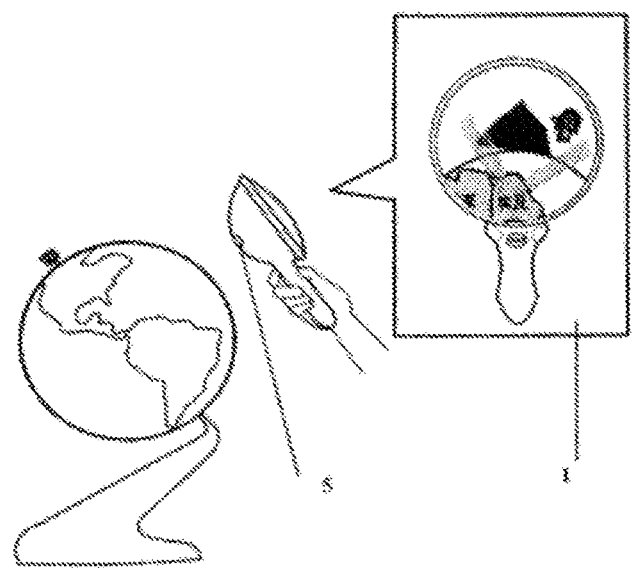
FIG. 8 shows a schematic diagram of the effect of the augmented reality which uses the second embodiment of the handheld viewing manner in FIG. 6.

FIG. 8 shows a schematic diagram of the effect of the augmented reality which uses the second embodiment of the handheld viewing manner in FIG. 6. In FIG. 8, the user takes the handheld viewing device to align it with a certain region (such as Egypt) on a globe, main camera 5 of the device begins to capture images, and projects the preset three-dimensional virtual animation on the globe. The final effect on round screen 1 is that the featured animation (such as the Pyramids and the Sphinx) of the country hovers on this region. For example, when a child takes this "scientific and magic magnifier" (i.e., the handheld viewing device) to align it with a certain country on the globe, the visual effect presented on the round screen is that three-dimensional figures of people wearing traditional clothing of the country stand on the globe and images of other information such as famous architectures, histories, and cultures, etc are displayed. Those different types of images can be switched by control button 3.

Figure 9:
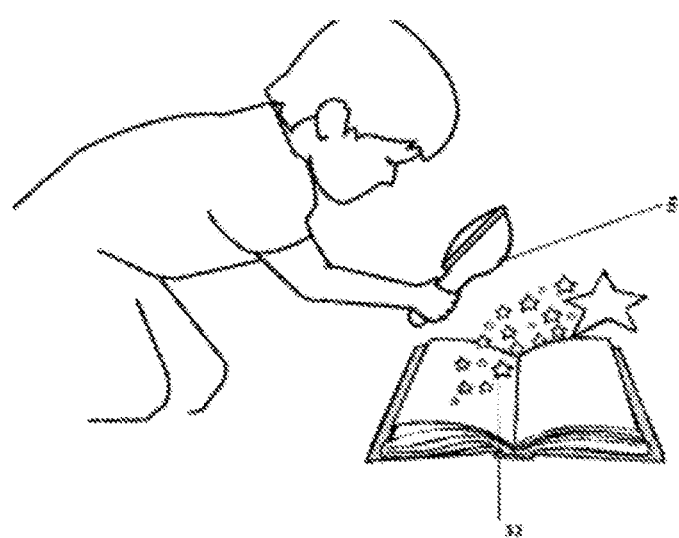
FIG. 9 shows a schematic diagram of the effect of the augmented reality which uses the third embodiment of the handheld viewing manner in FIG. 6.

FIG. 9 shows a schematic diagram of the effect of the augmented reality which uses the third embodiment of the handheld viewing manner in FIG. 6. In FIG. 9, the user takes the handheld viewing device to align it with the book or the card. Second camera 5 of the device begins to work, projecting three-dimensional virtual image 32 on the book. Finally, it can be seen on the round screen that the three-dimensional image which mixes the real scene with the virtual scene appears on the book.

Figure 10:
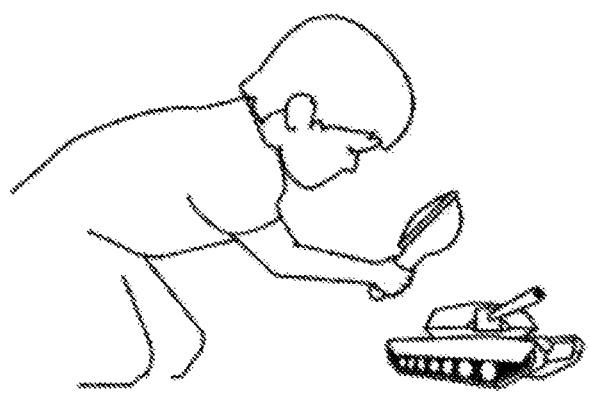
FIG. 10 shows a schematic diagram of the effect of the augmented reality which uses the fourth embodiment of the handheld viewing manner in FIG. 6.

FIG. 10 shows a schematic diagram of the effect of the augmented reality which uses the fourth embodiment of the handheld viewing manner in FIG. 6. In FIG. 10, the user takes the handheld viewing device to align it with a toy tank in the real scene. The camera of the device begins to work. After the processing of the intelligent computing terminal in the device, final visual effect that can be seen on the round screen is that alien spaceships are attacking the tank nearby. The kid can use the device to interact with the tank and control it. The combination of the virtuality and the reality is achieved through the AR technology. It can be seen that the cannon on the tank is moving and firing, shooting down alien spaceships one by one that are attacking the tank.

Using the handheld viewing device and the method of the application, the video collecting unit captures the real scene through the first camera. The intelligent computing terminal recognizes the two-dimensional code in the real scene to obtain the code value information and space position information. Then, the preset virtual scene is placed according to the space position information. The viewing frame which mixes the real scene and the virtual scene is generated. The round LED screen is used to display the viewing frame generated by the intelligent computing terminal. Compared with the prior art, the application uses the intelligent computing terminal to generate a virtual environment that highly matches the real scene and has vivid visual sense, auditory sense, touching sense, force sense, dynamic sense, and the like. Direct interaction between the user and virtual three-dimensional environment can be achieved. In this manner, children naturally correlate the language learning, the image recognition, and three-dimensional digital model together while learning, which enhances sensory stimulation in more dimensions and improves the efficiency of learning. The teaching with pleasure is achieved.

In the context above, embodiments of the application are described with reference to drawings. However, the person of ordinary skill in this art can understand that different changes or replacements to the embodiments of the application can be made without departing the spirit and scope of the application. All of the changes and replacements fall within the scope of the claims of the application.

What is claimed is:

1. An augmented reality (AR) technology-based handheld viewing device, comprising:
   a video collecting unit, used for capturing a real scene through a first camera;
   an intelligent computing terminal, used for recognizing a two-dimensional code in the real scene to obtain corresponding code value information and space position information, then positioning a preset virtual scene according to the space position information, and generating a viewing frame which mixes the real scene and the virtual scene;
   a voice output unit, used for outputting voice information corresponding to the virtual scene by a speaker; and
   a LED screen, which is round and is used for displaying the viewing frame generated by the intelligent computing terminal;
   wherein the intelligent computing terminal further comprises:
   a main thread processing unit, used for running a program logic operation and a rendering operation of the intelligent computing terminal; and
   a sub-thread processing unit, used for performing an image collecting operation, and sending an image collecting result back to the main thread processing unit.

2. The AR technology-based handheld viewing device according to claim 1, wherein, when the handheld viewing device moves, the two-dimensional code in the real scene is moved; wherein the intelligent computing terminal controls the image in the virtual scene to move according to the moving two-dimensional code; and wherein the LED screen outputs dynamic viewing frame after the handheld viewing device moves.

3. The AR technology-based handheld viewing device according to claim 2, wherein the intelligent computing terminal further comprises:
   a buffering unit, used for backing up the code value information and the space position information corresponding to a plurality of two-dimensional codes previous to a current frame, delaying driving of a movement of a three-dimensional object in the virtual scene for a corresponding number of frames to reserve a process time for recognizing the two-dimensional code.

4. The AR technology-based handheld viewing device according to claim 3, wherein an instantaneous position of the three-dimensional object in the virtual scene is obtained by interpolating the space position information of the backed-up plurality of two-dimensional codes.

5. The AR technology-based handheld viewing device according to claim 1, wherein the intelligent computing terminal comprises:
   a network interface, used for downloading a plurality of AR applications from the Internet, and selecting one AR application to execute according to a requirement of a user; and
   a two-dimensional code recognizing unit, wherein when the user moves the two-dimensional code in the real scene to a capturing range of the first camera, the two-dimensional code recognizing unit automatically tracks and recognizes the two-dimensional code to obtain the code value information and the space position information.

6. The AR technology-based handheld viewing device according to claim 5, wherein the intelligent computing terminal further comprises:
   a virtual scene generating unit, used for inquiring to acquire a matching virtual scene according to the space position information from the two-dimensional code recognizing unit; and
   a virtual real-time rendering unit, used for rendering the acquired virtual scene in real time, and displaying the rendered scene which mixes the virtual scene with the real scene on the LED screen.

7. The AR technology-based handheld viewing device according to claim 6, wherein the intelligent computing terminal further comprises:
   an interaction unit, used for recognizing an interaction operation of a face or a hand, and obtaining three-dimensional information implied in the real scene according to the interaction operation, and making the three-dimensional information and the three-dimensional object in the virtual scene directly interact.

8. The AR technology-based handheld viewing device according to claim 1, wherein the real scene includes a book, a flash card, an object and an environmental image in a Science and Technology Museum or other museums.

9. The AR technology-based handheld viewing device according to claim 8, wherein the handheld viewing device further comprises a storage unit, used for storing the virtual scene data corresponding to the AR application.

10. The AR technology-based handheld viewing device according to claim 1, wherein the main thread processing unit sends an image collecting requirement to the sub-thread processing unit; and wherein the sub-thread processing unit performs the image collecting operation according to the image collecting requirement.

11. The AR technology-based handheld viewing device according to claim 1, wherein the handheld viewing device has an external contour similar to that of a magnifier, wherein the handheld viewing device comprises a round body and a holding portion, wherein the round body is provided with the LED screen having a touch control function, and wherein a connection portion between the round body and the holding portion has a control button.

12. The AR technology-based handheld viewing device according to claim 11, wherein the touch control function of the LED screen uses a resistive, a capacitive, an infrared scanning, or an infrared image sensing type of sensor to realize a touch operation.

13. The AR technology-based handheld viewing device according to claim 11, wherein a second camera and a microphone are arranged in the center of a top end of the round body, wherein the second camera is used for collecting the real scene on one side of the LED, and wherein the microphone is used for receiving a voice interaction information of the user.

14. The AR technology-based handheld viewing device according to claim 11, wherein the first camera is located on the other side of the round body which is opposite to the LED screen, wherein the first camera is used to collect and capture the real scene on this side; and wherein the first camera is a charged coupled device (CCD) image sensor or a complementary metal-oxide-semiconductor (CMOS) image sensor.

15. The AR technology-based handheld viewing device according to claim 11, wherein a function button is arranged on the side of the round body, and is used for switching between different functions of the handheld viewing device.

16. The AR technology-based handheld viewing device according to claim 1, wherein the handheld viewing device further comprises a brightness sensor and an auxiliary backlight source,
wherein the brightness sensor is used for detecting the ambient light intensity of the handheld viewing device; and wherein the auxiliary backlight source provides auxiliary backlight when the ambient light intensity is not sufficient.

17. An augmented reality (AR) technology-based handheld viewing method, comprising:
capturing, by a video collecting unit, a real scene through a first camera;
recognizing, by an intelligent computing terminal, a two-dimensional code in the real scene to obtain corresponding code value information and space position information;
positioning a preset virtual scene according to the space position information, and generating a viewing frame which mixes the real scene and the virtual scene;
outputting, by a voice output unit, the voice information corresponding to the virtual scene by a speaker;
displaying, on a LED screen which is round, the viewing frame generated by the intelligent computing terminal;
running a program logic operation and a rendering operation performed during a processing of the intelligent computing terminal through a main thread processing unit and a sub-thread processing unit;
performing an image collecting operation through the sub-thread processing unit; and
sending an image collecting result back to the main thread processing unit.

18. The AR technology-based handheld viewing method according to claim 17 further comprises following steps: when the handheld viewing device is moved, the two-dimensional code in the real scene is moved, controlling, by the intelligent computing terminal, an image in the virtual scene to move according to the moving two-dimensional code, and outputting, by the LED screen, a dynamic viewing frame after the handheld viewing device moves.

19. The AR technology-based handheld viewing method according to claim 18 further comprises following steps:
backing up the code value information and the space position information corresponding to a plurality of two-dimensional codes previous to a current frame; and delaying driving of a movement of a three-dimensional object in the virtual scene for a corresponding number of frames to reserve a process time for recognizing the two-dimensional code.

20. The AR technology-based handheld viewing method according to claim 19, wherein an instantaneous position of the three-dimensional object in the virtual scene is obtained by interpolating the space position information of the backed-up plurality of two-dimensional codes.

21. The AR technology-based handheld viewing method according to claim 17, wherein the intelligent computing terminal comprises:
a network interface, used for downloading a plurality of AR applications from the Internet, and selecting one AR application to execute according to a requirement of a user; and
a two-dimensional code recognizing unit, wherein when the user moves the two-dimensional code in the real scene to a capturing range of the first camera, the two-dimensional code recognizing unit automatically tracks and recognizes the two-dimensional code to obtain the code value information and the space position information.

22. The AR technology-based handheld viewing method according to claim 21, wherein the intelligent computing terminal further comprises:
a virtual scene generating unit, used for inquiring to acquire a matching virtual scene according to the space position information from the two-dimensional code recognizing unit; and
a virtual real-time rendering unit, used for rendering the acquired virtual scene in real time, and displaying the rendered scene which mixes the virtual scene with the real scene on the LED screen.

23. The AR technology-based handheld viewing method according to claim 22, wherein the intelligent computing terminal further comprises:
an interaction unit, used for recognizing an interaction operation of a face or a hand, and obtaining three-dimensional information implied in the real scene according to the interaction operation, and making the three-dimensional information and the three-dimensional object in the virtual scene directly interact.

24. The AR technology-based handheld viewing method according to claim 17, wherein the real scene includes a book, a flash card, an object and an environmental image in a Science and Technology Museum or other museums.

25. An augmented reality (AR) technology-based handheld viewing device, comprising:
a round body, including a front side and a back side that are arranged oppositely; wherein a LED screen, a second camera, and a microphone are arranged on the front side of the round body, and wherein a first camera and a speaker are arranged on the back side of the round body; and
a holding portion, connected to the round body, wherein the holding portion is used for holding the handheld viewing device;
wherein the handheld viewing device renders a real scene which is captured by the first camera into a three-dimensional virtual scene, and then displays a viewing frame which mixes the real scene with the virtual scene through the LED screen.

26. The AR technology-based handheld viewing device according to claim 25, wherein the touch control function of the LED screen uses a resistive, a capacitive, an infrared scanning, or an infrared image sensing type of sensor to realize a touch operation.

27. The AR technology-based handheld viewing device according to claim 25, wherein the second camera and the microphone are arranged in the center of a top end of round body, wherein the second camera is used for collecting the real scene on the front side of the round body; and wherein the microphone is used for receiving a voice interaction information of the user.

28. The AR technology-based handheld viewing device according to claim 25, wherein the first camera is used for collecting and capturing the real scene on the back side of the round body; and wherein the first camera is a charged coupled device assembly (CCD) image sensor or a complementary metal-oxide-semiconductor (CMOS) image sensor.

29. The AR technology-based handheld viewing device according to claim 25, wherein a function button is arranged on the side of the round body, and is used for switching between different functions of the handheld viewing device.

30. The AR technology-based handheld viewing device according to claim 25, wherein a control button is arranged at a connection portion between the round body and the holding portion.

31. The AR technology-based handheld viewing device according to claim 25, wherein the handheld viewing device further comprises a brightness sensor and an auxiliary backlight source;
    wherein the brightness sensor is used for detecting the ambient light intensity of the handheld viewing device; and wherein the auxiliary backlight source will provide auxiliary backlight when the ambient light intensity is not sufficient.

* * * * *